(12) United States Patent
Fukuda et al.

(10) Patent No.: US 11,120,820 B2
(45) Date of Patent: Sep. 14, 2021

(54) DETECTION OF SIGNAL TONE IN AUDIO SIGNAL

(71) Applicant: INTERNATIONAL BUSINESS MACHINES CORPORATION, Armonk, NY (US)

(72) Inventors: Takashi Fukuda, Yokohama (JP); Masayuki Suzuki, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 16/210,665

(22) Filed: Dec. 5, 2018

(65) Prior Publication Data

US 2020/0184995 A1 Jun. 11, 2020

(51) Int. Cl.
*G10L 25/81* (2013.01)
*H04M 3/42* (2006.01)
*H04M 3/493* (2006.01)

(52) U.S. Cl.
CPC .......... *G10L 25/81* (2013.01); *H04M 3/42017* (2013.01); *H04M 3/4936* (2013.01); *H04M 2203/2027* (2013.01)

(58) Field of Classification Search
USPC .............................................. 704/205–211
See application file for complete search history.

(56) References Cited

U.S. PATENT DOCUMENTS

| | | | |
|---|---|---|---|
| 2003/0156709 A1* | 8/2003 | Lee .................... | H04M 15/06 379/372 |
| 2006/0008074 A1* | 1/2006 | Itoh .................... | H04Q 1/46 379/386 |
| 2007/0116208 A1 | 5/2007 | Williams et al. | |
| 2007/0160124 A1* | 7/2007 | Dorr .................... | G10L 19/00 375/222 |
| 2009/0192788 A1* | 7/2009 | Yoshioka ............ | G10L 25/78 704/206 |
| 2014/0029733 A1 | 1/2014 | Smith et al. | |
| 2014/0195501 A1 | 7/2014 | Vlack et al. | |
| 2016/0104486 A1* | 4/2016 | Penilla ................ | G10L 15/005 704/232 |
| 2017/0200449 A1* | 7/2017 | Penilla ................ | G10L 17/04 |
| 2018/0061415 A1* | 3/2018 | Penilla ................ | G10L 15/22 |

* cited by examiner

*Primary Examiner* — Leonard Saint Cyr
(74) *Attorney, Agent, or Firm* — Tutunjian & Bitetto, P.C.; Randall Bluestone

(57) ABSTRACT

A technique for detecting a signal tone in an audio signal is disclosed. A determination is made as to whether a peak modulation frequency in the audio signal is in a specific range or not to obtain a determination result. A measure regarding a modulation spectrum of the audio signal is calculated. The measure is calculated based on at least components of the modulation spectrum above a specific limit of modulation frequency. By using the determination result and the measure regarding the modulation spectrum, a judgement is done as to whether the audio signal contains a signal tone or not.

20 Claims, 6 Drawing Sheets

DETECTION OF SIGNAL TONE IN AUDIO SIGNAL

BACKGROUND

Technical Field

The present disclosure, generally, relates to acoustic segmentation technique, more particularly, to technique for detecting a signal tone in an audio signal.

Description of the Related Art

Audio signals such as recordings of telephone conversations includes various sound sources, which may include a ring tone, a busy tone and hold music in addition to human voices. These are factors that would degrade performance of automatic speech recognition (ASR).

A signal pattern of the ring tone may be defined by a law, standards bodies, and so on. However, the specific patterns of the ring tone are different. In North America, the standard ring tone is a repeating signal of a 2-second tone with a 4-second pause where the tone signal is composed of the frequencies 440 Hz and 480 Hz. In Japan, the ring tone is defined in the telecommunications equipment rules Article 33 as a repeating signal of a 1 second tone and a 2 second pause where the tone signal, having a frequency of 400 Hz, is modulated with 15-20 Hz. Many European countries adopt the ring tone recommended by ETSI (European Telecommunications Standards Institute) where the fundamental frequency is 425 Hz and a signal including a 1 second tone followed by a 3-5 second silence is repeated.

SUMMARY

According to an embodiment of the present invention, a computer-implemented method for detecting a signal tone in an audio signal is provided. The method includes determining whether a peak modulation frequency in the audio signal is in a specific range or not to obtain a determination result. The method also includes calculating a measure regarding a modulation spectrum of the audio signal, in which the measure is calculated based on at least components of the modulation spectrum above a specific limit of modulation frequency. The method further includes judging whether the audio signal contains a signal tone or not using the determination result and the measure regarding the modulation spectrum.

Computer systems and computer program products relating to one or more aspects of the present invention are also described and claimed herein.

Additional features and advantages are realized through the techniques of the present invention. Other embodiments and aspects of the invention are described in detail herein and are considered a part of the claimed invention

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Hereinafter, the present invention will be described with respect to particular embodiments, but it will be understood by those skilled in the art that the embodiments described below are mentioned only by way of examples and are not intended to limit the scope of the present invention.

One or more embodiments according to the present invention are directed to computer-implemented methods, computer systems and computer program products for detecting a ring tone in an audio signal in an efficient manner.

Figure 1:
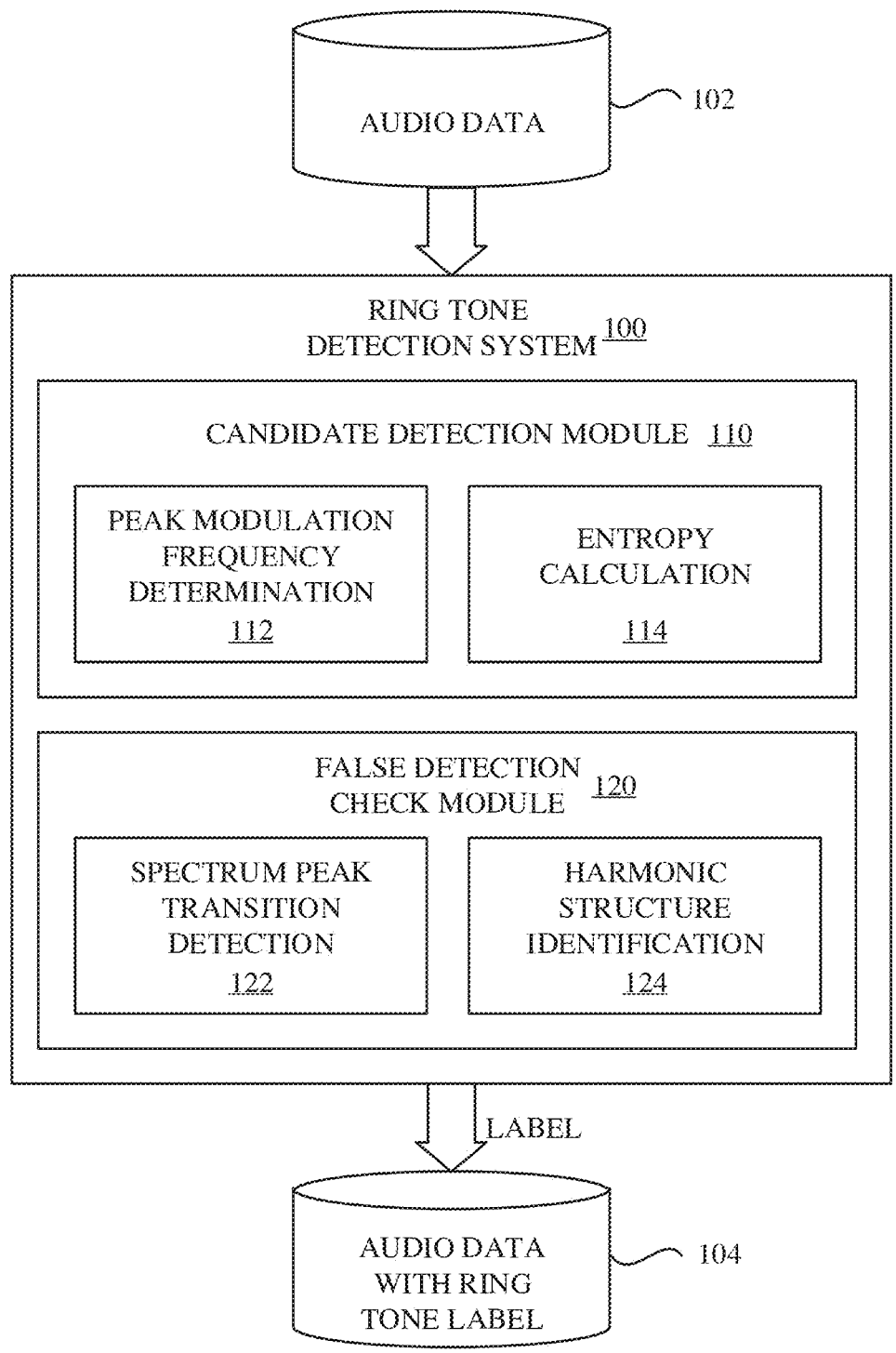
FIG. 1 illustrates a block diagram of a ring tone detection system according to an exemplary embodiment of the present invention.

With reference to FIG. 1, a block diagram of a ring tone detection system according to an exemplary embodiment of the present invention is illustrated.

As shown in FIG. 1, there is a ring tone detection system 100 that performs a novel process of detecting a ring tone in a given audio data. The ring tone detection system 100 reads an audio data 102, received by way of a mobile telephone, for example, and outputs a label (ring tone label), which may be stored together with the audio data 102 to give an audio data with ring tone label 104. The audio data 102 read by the ring tone detection system 100 may be any audio files or streams in an appropriate format, which is typically a telephony data that is recording data of telephone conversations. The ring tone label is a label aligned to a part of the audio data 102 that is considered to include at least a part of the ring tone.

In FIG. 1, a detail of the ring tone detection system 100 is shown. The ring tone detection system 100 includes a candidate detection module 110 that scans the audio data 102 and detects candidates that can be considered as a part corresponding to the ring tone; and a false detection check module 120 that performs a further inspection on the detected candidates and checks whether the detected candidate is considered to be a false detection or not.

Since subsequent process performed by the candidate detection module 110 and the false detection check module 120 may be based on a result of frequency analysis of the audio data 102, the ring tone detection system 100 may be configured to perform a frequency analysis on the audio data 102 with sliding a frame having a predetermined size with a predetermined frame shift, to generate a series of frequency spectra along with a time axis (thus time series of the spectra). Its visual representation is known as a spectrogram.

The candidate detection module 110 is configured to set a time window for analysis in the audio data 102 along with time axis (accordingly the time series of the spectra) and determine whether a part where the time window is set can be considered as a candidate of the ring tone or not. By sliding the time window with a predetermined sliding interval, a whole of the audio data 102 can be scanned. The detected candidates are passed to the false detection check module 120 for the further inspection.

In the described embodiment, the candidate detection module 110 may include a peak modulation frequency determination sub-module 112; and an entropy calculation sub-module 114, as illustrated in FIG. 1.

Both the peak modulation frequency determination sub-module 112 and the entropy calculation sub-module 114 work to enumerate the candidates of the ring tone observed in the audio data 102. Both of the sub-modules 112, 114 focus on a modulation frequency of an audio signal, which is a frequency of temporal variation observed in the audio signal at a range of frequency lower than the acoustic frequency band. The time series of the frequency spectra is subjected to be analyzed. A part of the generated time series of the spectra, which includes a predetermined number of frames, corresponds to the part where the time window is set.

The peak modulation frequency determination sub-module 112 is configured to determine whether a peak modulation frequency in the audio signal (of the part where the time window is set) is in a specific range or not to obtain a determination result. Note that the specific range is a range above the range of the modulation frequencies of utterances of human voice, which is said to be in the range of 2 Hz to 10 Hz. In a particular embodiment, the specific range is a range of 10 Hz or more.

In the described embodiment, the peak modulation frequency determination sub-module 112 first finds a frequency range that has a relatively large magnitude in the spectra (this specific frequency range having a relatively large magnitude in the spectra is referred to as a predominant frequency range) and then observes spectrum change in the time series at this predominant frequency range to identify a peak component of temporal variation.

The peak component can be identified by performing again a frequency analysis on the time series of the spectra at the predominant frequency range and by detecting the peak component in the result of the frequency analysis.

Then, the peak modulation frequency determination sub-module 112 determines whether the identified peak modulation frequency is in the specific range or not. A ring tone shows an obvious peak at a specific range of modulation frequency. For example, since the tone is modulated with 15-20 Hz in Japan, the audio signal including a ring tone defined in Japan would show a relatively clear peak around 15-20 Hz. The peak modulation frequency determination sub-module 112 may further determine whether the identified peak modulation frequency, which is in the specific range, sustains for a certain period at a fixed location or not. Even though the modulation frequency components of the human voice would be broad and its peak components would sometimes reach the boundary of the aforementioned specific range, such human voice can be discriminated from the ring tone by checking the continuity and the stability of the peak modulation frequency component.

The determination result may include a result where a sustained peak component is found within the specific range, a result where a sustained peak component is found outside the specific range and a result where no clear sustained peak is found. The existence of the peak at the specific range indicates relatively higher possibility that the part where the time window is set contains at least a part of a ring tone. Based on the determination result, the final determination is made as to whether the part under the analysis is judged as the ring tone containing part or not. The characteristics where the ring tone changes more rapidly than normal human voice are leveraged.

Note that, in the described embodiment, the peak modulation frequency is identified by performing the frequency analysis on the audio data while sliding the frame, by finding the predominant frequency range having the relatively higher magnitude in the spectra and by performing again a frequency analysis on the time series at the predominant frequency range. However, identification of the peak modulation frequency is not limited to the specific way described herein. In other embodiment, the frequency analysis can be performed on the time series at a predetermined frequency range(s) since typical signal patterns of the ring tone may be known from information of a law, standards bodies, etc. In other embodiments, frequency analysis on a time series of acoustic features that are based on the frequency analysis of the audio signal may be contemplated. In other embodiments, frequency analysis on an envelope of the audio signal may be also contemplated.

The entropy calculation sub-module 114 is configured to calculate entropy of a modulation spectrum for the audio signal (of the part where the time window is set). The entropy of the modulation spectrum can be calculated based on at least components of the modulation spectrum above a specific limit of modulation frequency. Note that the specific limit is an upper limit of the modulation frequency of a normal human voice. The upper limit of the modulation frequency of the normal human voice can be used as a lower limit of consideration for calculating the entropy of the modulation spectrum. In a particular embodiment, the specific limit is at 10 Hz since the range of the modulation frequencies of the utterances of the normal human voice is said to be in the range of 2 Hz to 10 Hz. The entropy of the modulation spectrum is calculated by treating a relative magnitude of a component in the modulation spectrum as an existence probability of the component. The modulation spectrum itself can be constructed by using any appropriate technique.

The lower entropy of the modulation spectrum indicates relatively higher possibility that the part where the time window is set contains the ring tone. By comparing the entropy of the modulation spectrum with a predetermined threshold, the final determination is made as to whether or not the part under the analysis is judged as the ring tone containing part.

The calculation of the entropy of the modulation frequency makes the detection of the ring tone more robust to the difference of the recording level and that of the standard. The way of calculating the entropy of the modulation spectrum will be described in more detail later.

In the described embodiment, the entropy of the modulation spectrum is employed as a measure regarding the modulation spectrum. The entropy of the modulation spectrum is a preferable measure regarding the modulation spectrum since the entropy can evaluate a modulation frequency with a relatively high probability in a robust manner. However, the measure regarding the modulation spectrum is not limited to the entropy. Other measures that characterize the modulation spectrum can be employed as long as they can evaluate a modulation frequency with a relatively high probability. Such measures may include kurtosis that can be calculated from the modulation spectrum by treating components above the upper limit of the modulation frequency of the normal human voice as a distribution.

The false detection check module 120 is configured to perform a further inspection on the candidates detected by candidate detection module 110 and checks whether each detected candidate is considered to be a false detection or not. By further checking each detected candidate of the ring tone, only plausible candidates are extracted from all the detected candidates, as a final result. The candidates passed the checking are output as the final result. In the described embodiment, the false detection check module 120 may include a spectrum peak transition detection sub-module 122; and a harmonic structure identification sub-module 124.

The spectrum peak transition detection sub-module 122 is configured to check whether the time series of the spectra calculated from the audio signal shows a transition of a peak frequency component along the time axis or not to obtain a check result. Certain utterances of human voice under limited conditions (e.g., interjections "umm", "hmm") may have a modulation frequency component similar to that of the ring tone. However, such an utterance would show a transition of a peak frequency component in the spectra. Thus, such utterances can be distinguished from the ring tone by checking linearity of the peak frequency component in the spectra. Note that the linearity of the peak frequency component means a degree of straightness of a line when the peak frequency components observed in the spectra at different time points render the line in the time-frequency plane.

When the variation range of the position of the peak frequency component within a specific time interval exceeds a predetermined threshold, the spectrum peak transition detection sub-module 122 determines that there is the transition of the peak frequency component. Based, at least in part, on the check result, the final determination may be made as to whether or not the part under the analysis is judged as the ring tone containing part.

The harmonic structure identification sub-module 124 is configured to confirm that there is no harmonic structure in the spectra to obtain a confirmation result. Since certain kind of human utterance may have a harmonic structure, which may include a fundamental frequency and one or more harmonic frequency above the fundamental frequency, resulting in a comb shape in the spectrum. The harmonic structure itself can be detected by using any known standard technique, including an acoustic signal processing based method, a model (e.g., GMM (Gaussian mixture model)) based method. Based, at least in part, on the confirmation result, the final determination may be made as to whether or not the part under the analysis is judged as the ring tone containing part or not.

The ring tone detection system 100 is configured to judge whether the audio signal contains a ring tone or not using the determination result, the entropy of the modulation spectrum, the check result and the confirmation result. All results are preferably used for the final determination. However, depending on the application of the output of the ring tone detection system 100, the comprehensiveness and the recall is given priority over the precision and accuracy. In such use case, the results and process of the spectrum peak transition detection sub-module 122 and/or the harmonic structure identification sub-module 124 can be omitted. Thus, in one or more embodiments, the judgement can be done as to whether the audio signal contains a ring tone or not by using at least the determination result and the entropy of the modulation spectrum.

By sliding the time window with the predetermined sliding interval, the whole of the audio data 102 is scanned and a period corresponding to the ring tone can be identified. The ring tone label that indicates whether the corresponding part is considered to be the ring tone containing part or not is aligned to each part or the period that includes a plurality of parts.

In particular embodiments, each of modules 110, 120 of the ring tone detection system 100 and its submodules 112, 114, 122, 124 described in FIG. 1 may be, but not limited to, implemented as a software module including program instructions and/or data structures in conjunction with hardware components such as a processor, a memory, etc.; as a hardware module including electronic circuitry; or as a combination thereof. These modules 110, 120 and submodules 112, 114, 122, 124 described in FIG. 1 may be implemented on a single computer device such as a personal computer and a server machine or over a plurality of devices such as a computer cluster of the computer devices in a distributed manner. The audio data 102 may be stored in a storage area provided by using any internal or external storage device or medium, to which processing circuity of a computer system implementing the ring tone detection system 100 is operatively coupled.

Figure 2:
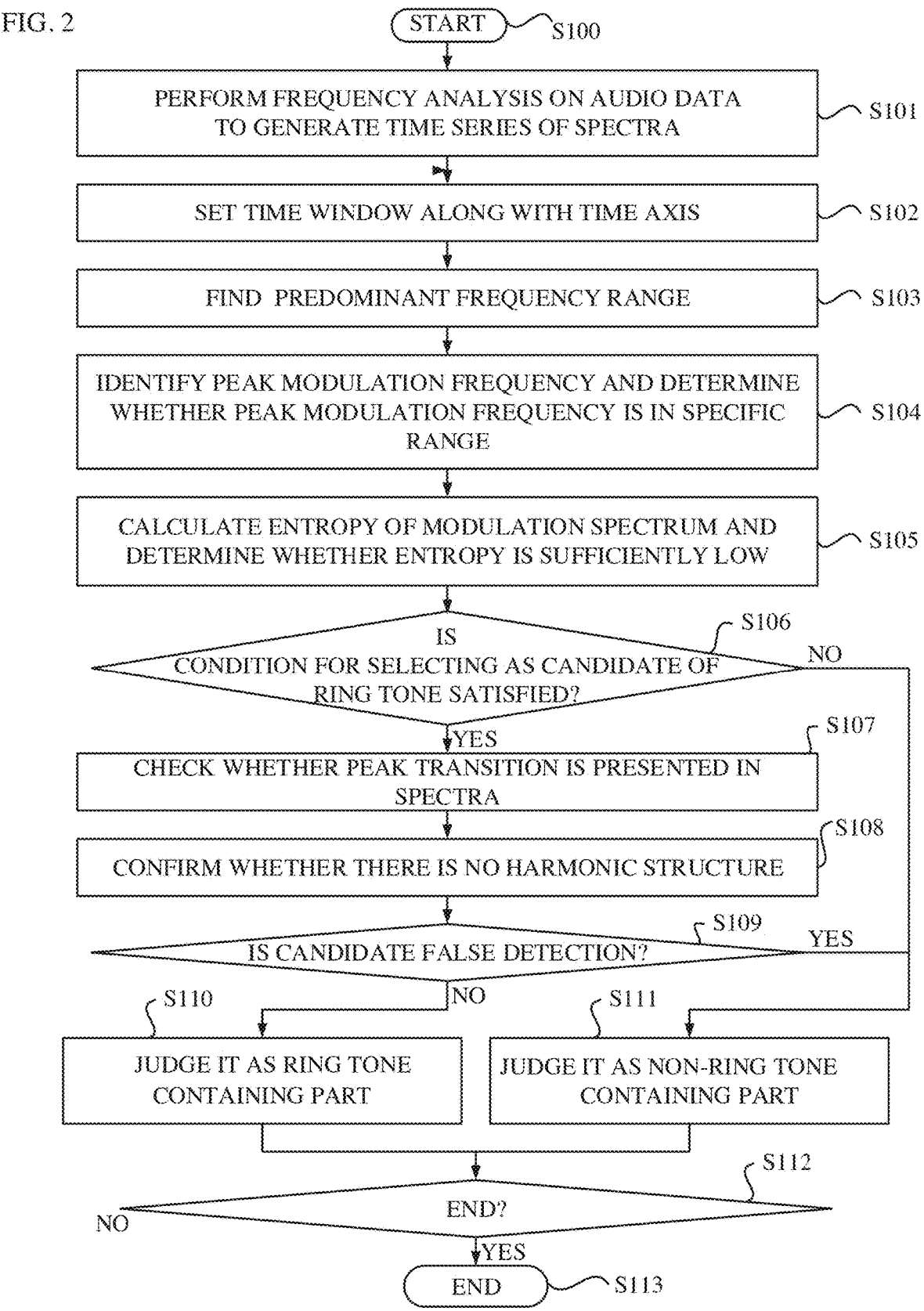
FIG. 2 is a flowchart depicting a process of detecting a ring tone in an audio data according to an exemplary embodiment of the present invention.

Hereinafter, referring to FIG. 2 together with FIGS. 3-4, a process of detecting a ring tone in an audio data according to an exemplary embodiment of the present invention is described. FIG. 2 shows a flowchart of the process of detecting the ring tone in the audio data.

The process shown in FIG. 2 may begin at block S100 in response to receiving, from an operator, a request for ring tone detection, which may specify an input audio data to be processed. Note that the process shown in FIG. 2 may be performed by processing circuitry such as a processing unit of a computer system that implements the ring tone detection system 100 shown in FIG. 1. Also note that the process shown in FIG. 2 is described to be a process for single input audio data. However, the process shown in FIG. 2 can be performed for each audio data in a given collection.

At block S101, the processing unit may read the input audio data and perform a frequency analysis on the input audio data. By analyzing the input audio data, a series of spectra along with a time axis (i.e., the time series of the spectra) is generated. Appropriate frame size and frame shift may be set for the frequency analysis.

At block S102, the processing unit may set a time window on the time series of the spectra by sliding the time window of a predetermined length with a predetermined sliding interval along with the time axis. A part of the generated time series of the spectra, including a predetermined number of frames, corresponds to the part where the time window is set.

At block S103, the processing unit may find a predominant frequency range that corresponds to a frequency range having maximum magnitude in the spectra within the time window.

Figure 3A:
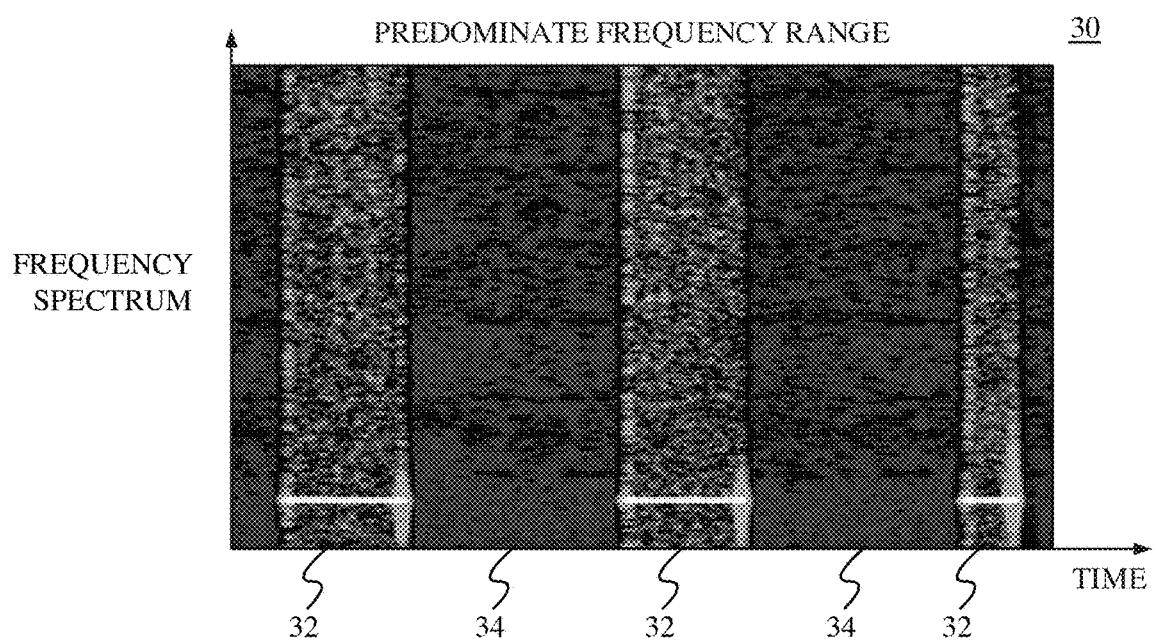
FIG. 3A shows an example of a spectrogram of an audio data containing a ring tone.

FIG. 3A shows an example of a spectrogram 30 of an audio data containing a ring tone. In the spectrogram 30, the horizontal axis represents time, the vertical axis represents a frequency component and the intensity of each point indicates the magnitude of the particular frequency component at the particular time.

As shown in FIG. 3A, a periodic structure that corresponds to a repeating signal including a tone 30 and a pause 32 is observed in the spectrogram 30. There is a certain frequency component that has a relatively large magnitude through the presented range of the time series. This frequency component corresponds to the predominant frequency range at which the peak modulation frequency is detected. By constructing the time series at the predominant frequency components, the time series shows a temporal variation having a relatively higher frequency than the repetition frequency of the tone 32 and the pause 34. Such temporal variation can be characterized by the modulation frequency domain.

Referring back to FIG. 2, at block S104, the processing unit may identify a peak modulation frequency and determine whether the peak modulation frequency is in a specific range or not to obtain a determination result. The peak modulation frequency represents a sustained peak component of the temporal variation of the spectra at the predominant frequency range.

Figure 3B:
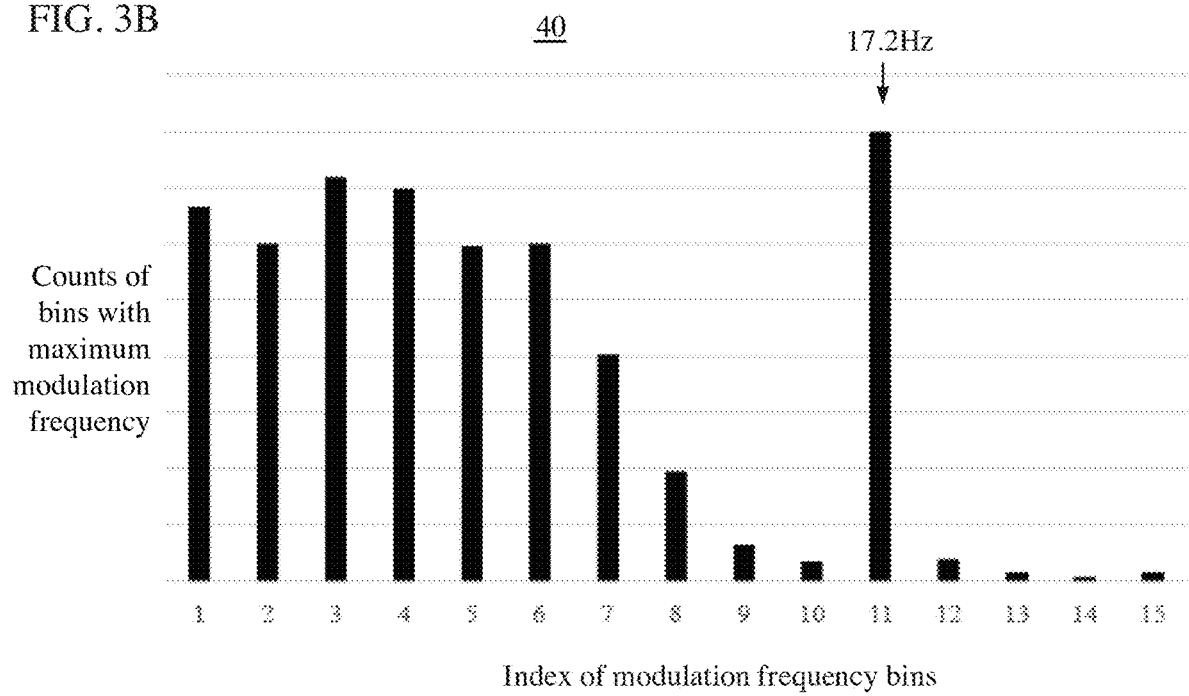
FIG. 3B shows an example of a histogram that shows observation counts of peak modulation frequency in an audio data containing both a ring tone and human voice.

FIG. 3B depicts an example of a histogram 40 that shows observation counts of the peak modulation frequency in the audio data that contains both the ring tone and the human voice. The horizontal axis represents indices of the modulation frequency bins and the vertical axis represents observation counts of bins corresponding to the peak modulation frequency.

The histogram 40 shown in FIG. 3B was constructed by using the real world audio data containing both the ring tone signal and the human voice. Note that the length of the audio signal corresponding to the ring tone and the length of the audio signal corresponding to the human voice that are included in the audio data were balanced to construct the histogram 40. The frame size of 25 ms and the frame shift of 10 ms were employed. Thus, the time series corresponded to a signal with a sampling frequency of 100 Hz. A 64-point FFT (Fast Fourier Transform) was employed for calculating the modulation spectrum. Thus, the time window had a length corresponding to 64 points. Hence, the resolution of the modulation spectrum was 50/32 (=1.56) Hz. The sliding interval was set to be 1 point. The modulation frequency bin having a maximum magnitude for each frame (the center frame of the time window) was counted to construct the histogram 40. The 11-th bin represents a modulation frequency of 17.2 Hz, corresponding to the modulation frequency of a ring tone.

As shown in FIG. 3B, the peak modulation frequency for the audio signal that contains human voice were dispersed over a wide range, resulting in a broad mountain shape at the range of the normal human voice (2-10 Hz). On the other hand, the peak modulation frequency for the audio signal that contains the ring tone were observed at a relatively narrow range, resulting in a sharp peak at the range above the normal human voice (>10 Hz).

Hence, by identifying the peak modulation frequency and comparing the peak modulation frequency with an appropriate threshold, the audio signal containing the ring tone can be detected when the audio signal has sufficiently good features.

Referring back to FIG. 2, at block S105, the processing unit may calculate entropy of a modulation spectrum and determine whether the entropy is sufficiently low or not. The entropy of the modulation spectrum, H, can be calculated as follows:

$$H = -\sum_{k=M}^{N} p_k \log p_k, \quad p_k = \frac{m_k}{\sum_{i=M}^{N} m_i}.$$

where $p_k$ represents the existence probability of the modulation spectrum in the k-th bin, the $m_k$ represents the magnitude of the modulation spectrum in the k-th bin, M denotes the lower limit index of the modulation frequency bin corresponding to an upper limit of the modulation frequency of the normal human voice (typically 10 Hz) and N denotes the maximum index of the modulation frequency bin.

As expressed in the aforementioned equations, the entropy can be calculated by treating a relative magnitude of a component (expressed by the second equation) in the modulation spectrum as an existence probability of the component for calculating the entropy, which is natively calculated for given probability distribution. The entropy can be calculated based on at least components above the specific limit of the modulation frequency (its index is M) in the modulation spectrum. The upper limit of the modulation frequency of the normal human voice is used as a lower limit of consideration for calculating the entropy. The components within the range of the modulation frequency of the normal human voice are preferably ignored.

The modulation spectrum itself can be constructed by using any appropriate technique. The modulation spectrum may be a 2-dimensional spectrum where one axis represents the modulation frequency and other axis represents the magnitude of the particular modulation frequency component when the acoustic frequency range of interest is fixed; or a 3-dimensional spectrum where one axis represents the modulation frequency, other axis represents the acoustic frequency and another axis represents the magnitude of the particular modulation frequency component observed at the particular acoustic frequency range. In a particular embodiment, similar to the processing of block S104, the modulation spectrum can be simply calculated by performing the frequency analysis on the time series of the spectra at the predominant frequency range.

At block S106, the processing unit may determine whether a condition for selecting as the candidate of the ring tone is satisfied or not based on the determination results and the entropy of the modulation frequency. When the determination result indicates that a sustained peak component is found within the specific range and/or the entropy is sufficiently low (lower than a predetermined threshold), the processing unit determines that the condition is satisfied and the process may proceed to block S107. Otherwise, the processing unit determines that the condition is not satisfied and the process may proceed directly to block S111.

At block S107, the processing unit may check whether the peak transition is presented in the spectra or not to obtain a check result. When the variation range of the position of the peak frequency component in the spectra measured within a specific time interval exceeds a predetermined threshold, the processing unit may determine that the transition is presented.

Figure 4:
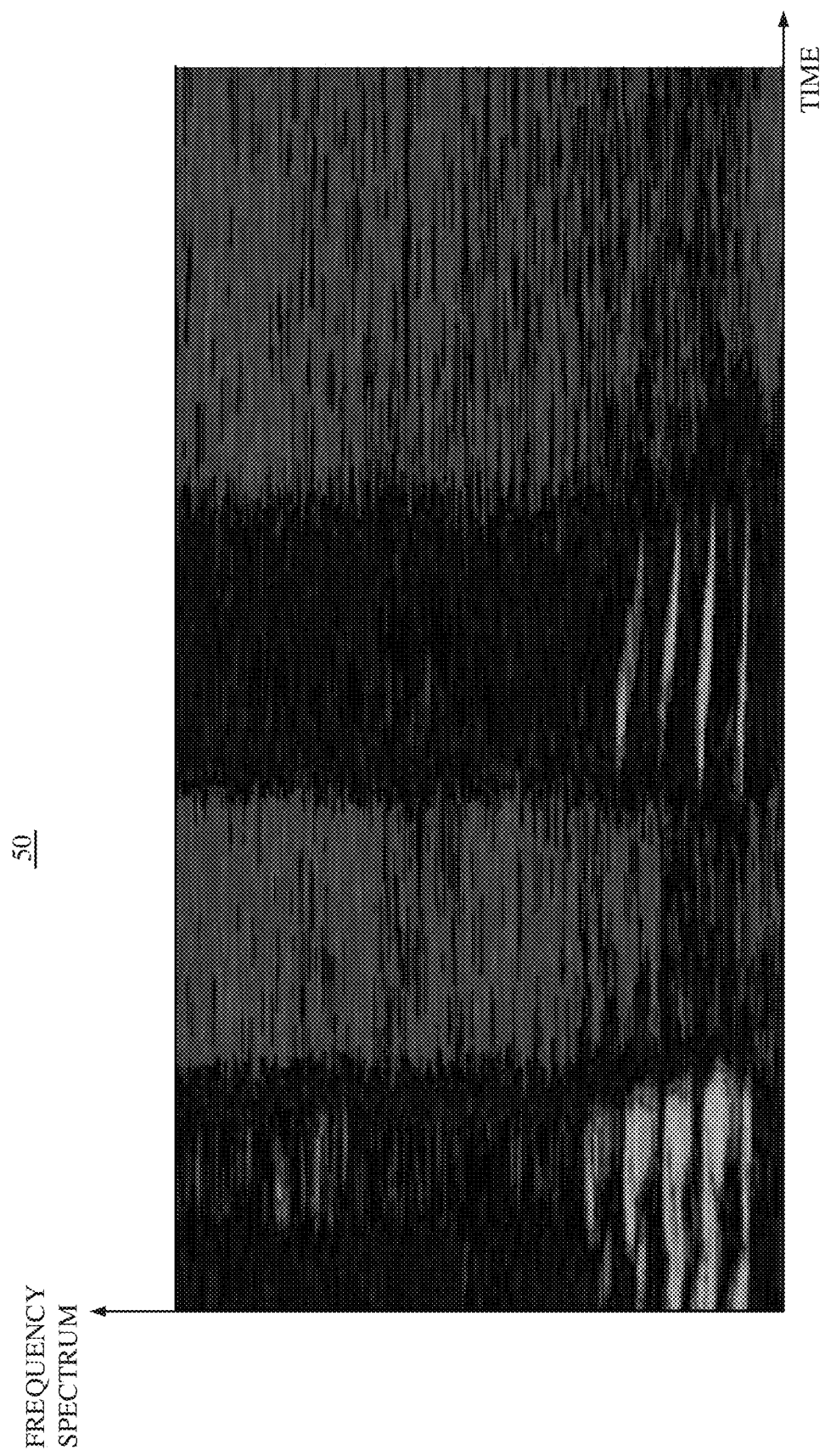
FIG. 4 depicts a typical spectrogram observed in an audio data containing utterance "umm" (or "hmm") of human voice.

FIG. 4 depicts a typical spectrogram 50 observed in an audio data containing an utterance "umm" (or "hmm") of the human voice. As shown in FIG. 4, the utterance of the human voice under the limited conditions may have a modulation frequency component above the upper limit of the modulation frequency of the normal human voice, which is similar to the peak modulation frequency of a ring tone. However, such utterances may show a transition of a peak frequency component in the spectra, which results in a degradation of the linearity of the peak frequency component in the spectra. By checking the linearity of the peak frequency component in the spectra, a false detection can be preferably eliminated.

Referring back to FIG. 2, at block S108, the processing unit may confirm whether there is no harmonic structure in the spectra or not to obtain a confirmation result. By confirming that there is no harmonic structure in the spectra, a false detection can be preferably eliminated.

At block S109, the processing unit may determine whether the candidate is considered to be a false detection or not to obtain a final determination result, based on the check result and the confirmation result. When the check result indicates a sufficient linearity of the peak frequency component in the spectra and the confirmation result denies the existence of the harmonic structure in the spectra, the processing unit may determine that the candidate is considered not to be a false detection. In this case, the process may branch to block S110. At block S110, the processing unit may judge the part where the time window is set as the ring tone containing part. Then the process may proceed to block S112.

On the other hand, the check result indicates the degradation of the linearity of the peak frequency component in the spectra and/or the confirmation result supports the existence of the harmonic structure in the spectra, the processing unit may determine that the candidate is considered to be a false detection. In this case, the process may branch to block S111. Also, when the processing unit judges that the condition is not satisfied in block S106, the process may proceed directly to block S111. At block S111, the processing unit may judge the part where the time window is set as not ring tone containing part. Then the process may proceed to block S112.

At block S112, the processing unit may determine whether the time window reaches the end of the input audio data or not. If the processing unit determines that the time window does not reach the end of the input audio data, the process may loop back to block 102 for next iteration. On the other hand, if the processing unit determines that the time window reaches the end of the input audio data, the process may branch to block 112 and the process may end at block S113.

Figure 5:
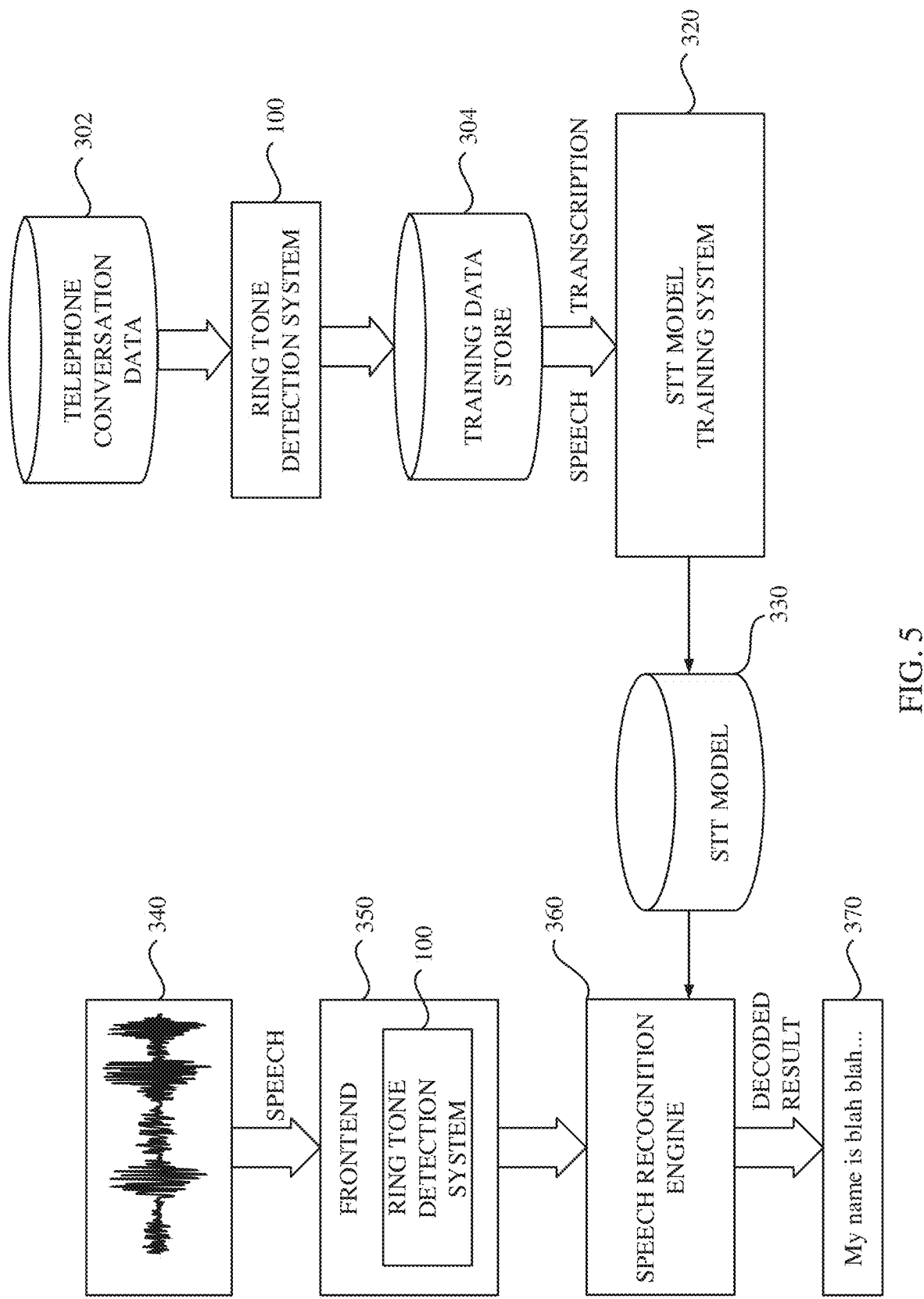
FIG. 5 illustrates use cases of the ring tone detection system according to the exemplary embodiment of the present invention.

Referring to FIG. 5, a use case of the ring tone detection system according to the exemplary embodiment of the present invention is further described.

As shown in FIG. 5, there is an STT model training system 320; and a speech recognition engine 360 as potential modules that use the result of the novel detection process according to the exemplary embodiment of the present invention.

The STT model training system 320 may perform training process by using a given training speech data stored in the training data store 304 to build the STT model 330, which may be used by the speech recognition engine 360. In a particular embodiment, the training speech data stored in the training data store 304 includes a training sample originating from the result of the ring tone detection system 100. The part of the audio data estimated as the ring tone parts are preferably excluded from the training data, in order to prevent performance degradation due to contamination of non-speech parts and useless resource consumptions. Note that since the ring tone includes not only tone signals but also a pause or silence interposed between the tone signals, an appropriate process of concatenating the tone containing part and the silence part may be performed in order to exclude the ring tone part from the training data.

The speech recognition engine 360 may perform speech recognition based on the STT model 330, which may be or may not be trained using the training data (e.g., telephone conversation data 302) processed by the ring tone detection system 100. There is a frontend 350 before the speech recognition engine 360. The frontend 350 may extract acoustic features from a received speech signal 340 by any known acoustic feature analysis to generate a sequence of the extracted acoustic features. In a particular embodiment, the frontend 350 may include further the ring tone detection system 100 according to the exemplary embodiment of the present invention. The frontend 350 may exclude the part estimated as the ring tone part from the target of the recognition in advance. The speech recognition engine 360 may predict most plausible speech contents for the input speech signals 340 based on the STT model 330 to output decoded results 370 while excluding the ring tone part from the target.

According to the exemplary embodiments described with reference to FIGS. 1 to 4, computer-implemented methods, computer systems and computer program products for detecting a ring tone in an audio signal are provided.

In a practical situation, the ring tone appears not only at the beginning of the audio data but also everywhere in the audio data. The ring tone often affects ASR performance due to an inappropriate CMS coefficient update, which is used for a reduction of convolutive noise in the audio data. Thus, these factor need to be removed with a simple way before ASR process.

Even though a signal pattern of the ring tone is defined as a law, standards bodies, and so on, the pattern of the ring tone is different depending on the recording system, the standard, the country or the business operator, and thus a simple template matching cannot be a practical solution for detecting the ring tone.

According to the aforementioned embodiment, the novel ring tone detection functionality capable of removing the ring tone in a simple and efficient manner is provided.

According to the computer-implemented methods, the computer systems and the computer program products described herein, improvements to functions and capabilities of a computer would be provided through reductions of a resource requirement (e.g., utilization of processing circuitry) and/or a storage requirement (e.g., a consumption of memory space). Such the improvements of the functions and the capabilities of the computer can be obtained by providing the computer-implemented methods, the computer systems and the computer program products for detecting a ring tone in an audio signal.

It is possible to reduce the utilization of the processing circuitry and the consumption of the memory space by excluding the ring tone part from the target of the processing of the specific purpose (e.g., STT process, training of a STT model) in comparison with a case where the processing is performed according to the specific purpose with the ring tone part included as it is. It is considered that the performance finally obtained when learning a speech recognition model or performing the speech recognition without knowing ringing-tone part as it is would be degraded as well as the time for training and/or analyzing would also increase slightly.

Note that, in the aforementioned embodiments, the ring tone is a target of the detection as one signal tone observed in the telephony data, which may be a factor that degrades the performance of the automatic speech recognition (ASR). However, other signal tone such as a busy tone can be expected to be detected by the novel detection process since the busy tone also contains a tone having a specific frequency followed by a pause or silence, which may also be defined by a law, standards bodies, and so on.

Note that the languages of a human voice included in the audio data to which the novel detection technique is applicable is not limited and such languages may include, but by no means limited to, Arabic, Chinese, English, French, German, Japanese, Korean, Portuguese, Russian, Spanish, for instance.

Experimental Studies

A program implementing the system and process shown in FIG. 1 and FIG. 2 according to the exemplary embodiment was coded and executed for given two collections of recording data of telephone conversations. A first collection included 20 sets of telephony conversation data in Japanese. Among these 20 sets of the conversation data in the first collection, 5 sets of the conversation data contained the ring tones. A second collection included 50 sets of telephony conversation data in English. Among these 50 sets of the conversation data in the second collection, 20 sets of the data contained ring tones.

The frame size of 25 ms and the frame shift of 10 ms were employed for the frequency analysis to generate the time series of the spectra. The length of the time window for frequency analysis on the time series was set to be 64 points and the sliding interval was set to be 1 point. The specific range for obtaining the determination result was set to be range of 13 Hz or more. The lower limit bin M for calculating the entropy was set so that the lower limit bin M corresponded to approximately 10 Hz, which is said to be the upper limit of the modulation frequency of the normal human utterance.

As for Example 1, all 5 sets of the telephony conversation data containing the ring tone were detected correctly from the 20 conversation data in the first collection. The period corresponding to the ring tone in each conversation data was also identified correctly. A recall of 100% and a precision of 100% were obtained.

As for Example 2, all 20 sets of the telephony conversation data containing the ring tone and the section corresponding to the ring tone were detected correctly from the second collection. But, one false detection occurred. Thus, a recall of 100% and a precision of 98% were obtained.

It was demonstrated that the novel ring tone detection process can detect ring tones in the telephony conversation data with high recall and precision. It was also confirmed that the novel ring tone detection process can be used for various language telephony data, including English telephony data and Japanese telephony data.

Computer Hardware Component

Figure 6:
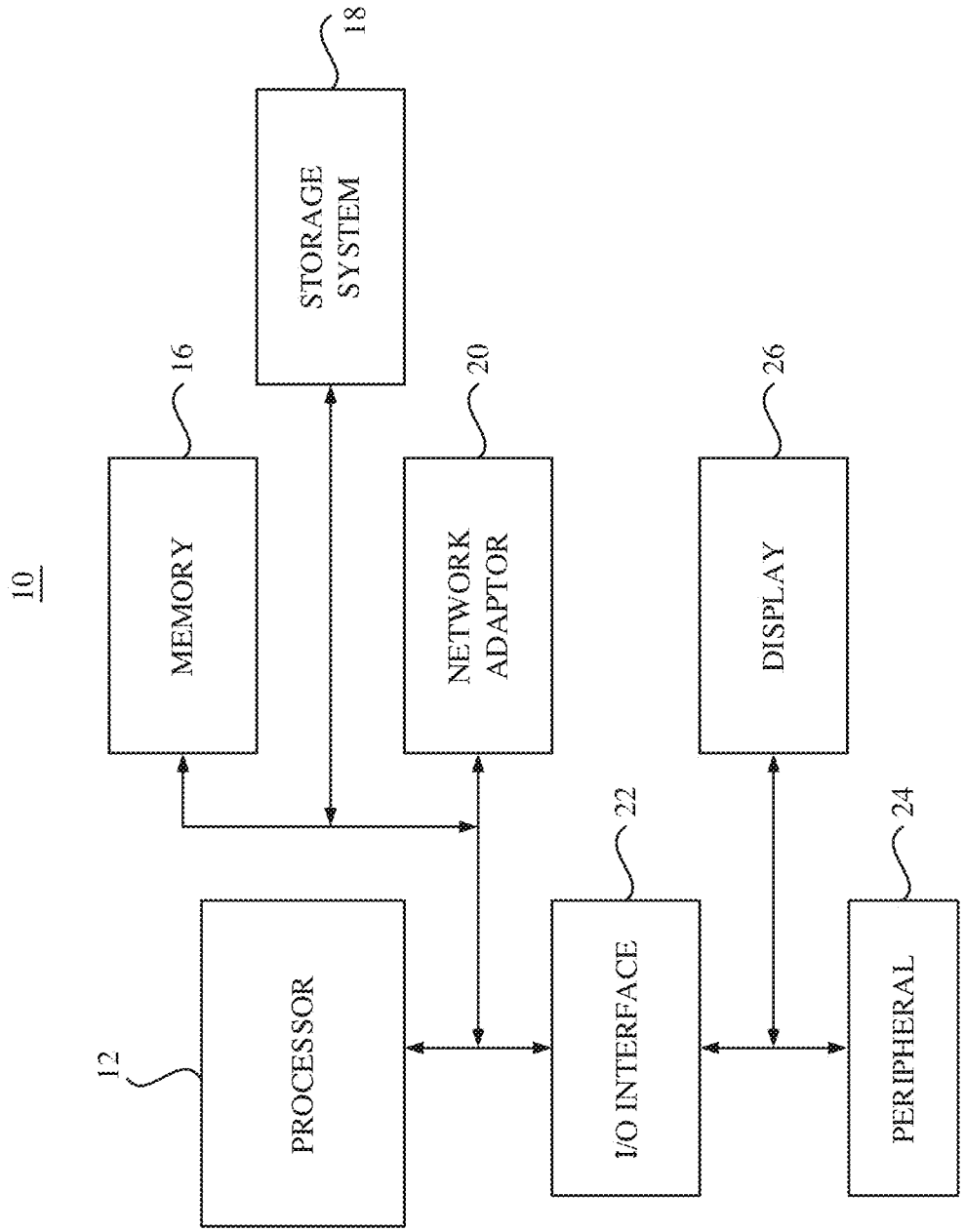
FIG. 6 depicts a schematic of a computer system according to one or more embodiments of the present invention.

Referring now to FIG. 6, a schematic of an example of a computer system 10, which can be used for the ring tone detection system 100, is shown. The computer system 10 shown in FIG. 6 is implemented as computer system. The computer system 10 is only one example of a suitable processing device and is not intended to suggest any limitation as to the scope of use or functionality of embodiments of the invention described herein. Regardless, the computer system 10 is capable of being implemented and/or performing any of the functionality set forth hereinabove.

The computer system 10 is operational with numerous other general purpose or special purpose computing system environments or configurations. Examples of well-known computing systems, environments, and/or configurations that may be suitable for use with the computer system 10 include, but are not limited to, personal computer systems, server computer systems, thin clients, thick clients, hand-held or laptop devices, in-vehicle devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 10 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 6, the computer system 10 is shown in the form of a general-purpose computing device. The components of the computer system 10 may include, but are not limited to, a processor (or processing unit) 12 and a memory 16 coupled to the processor 12 by a bus including a memory bus or memory controller, and a processor or local bus using any of a variety of bus architectures.

The computer system 10 typically includes a variety of computer system readable media. Such media may be any available media that is accessible by the computer system 10, and it includes both volatile and non-volatile media, removable and non-removable media.

The memory 16 can include computer system readable media in the form of volatile memory, such as random access memory (RAM). The computer system 10 may further include other removable/non-removable, volatile/non-volatile computer system storage media. By way of example only, the storage system 18 can be provided for reading from and writing to a non-removable, non-volatile magnetic media. As will be further depicted and described below, the storage system 18 may include at least one program product having a set (e.g., at least one) of program modules that are configured to carry out the functions of embodiments of the invention.

Program/utility, having a set (at least one) of program modules, may be stored in the storage system 18 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

The computer system 10 may also communicate with one or more peripherals 24 such as a keyboard, a pointing device, a car navigation system, an audio system, etc.; a display 26; one or more devices that enable a user to interact with the computer system 10; and/or any devices (e.g., network card, modem, etc.) that enable the computer system 10 to communicate with one or more other computing devices. Such communication can occur via Input/Output (I/O) interfaces 22. Still yet, the computer system 10 can communicate with one or more networks such as a local area network (LAN), a general wide area network (WAN), and/or a public network (e.g., the Internet) via the network adapter 20. As depicted, the network adapter 20 communicates with the other components of the computer system 10 via bus. It should be understood that although not shown, other hardware and/or software components could be used in conjunction with the computer system 10. Examples, include, but are not limited to: microcode, device drivers, redundant processing units, external disk drive arrays, RAID systems, tape drives, and data archival storage systems, etc.

Computer Program Implementation

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or block plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for detecting a signal tone in an audio signal, the method comprising:
    determining whether a peak modulation frequency in the audio signal is in a specific range or not to obtain a determination result;
    modifying the determination result responsive to a false detection process utilizing spectrum and harmonic analysis of the audio signal, with the spectrum analysis including determining that a position of the peak frequency component within a specific time interval exceeds a predetermined threshold;
    calculating a measure regarding a modulation spectrum of the audio signal, the measure being calculated based on at least components of the modulation spectrum above a specific limit of a modulation frequency; and
    judging whether the audio signal contains the signal tone or not using the determination result and the measure regarding the modulation spectrum.

2. The method of claim 1, wherein the method further includes:
    analyzing the audio signal to obtain a series of spectra along a time axis; and
    checking whether the series of spectra shows a transition of a peak frequency component along the time axis or not to obtain a check result, the judging being done further based on the check result.

3. The method of claim 2, wherein the method further includes:
    confirming that there is no harmonic structure in the series of spectra to obtain a confirmation result, the judging being done further based on the confirmation result.

4. The method of claim 1, wherein the measure is entropy of the modulation spectrum and the judging is done, at least by comparing the entropy of the modulation spectrum with a predetermined threshold.

5. The method of claim 4, wherein the entropy of the modulation spectrum is calculated by treating a relative magnitude of a component in the modulation spectrum as an existence probability of the component.

6. The method of claim 1, wherein the peak modulation frequency represents a sustained peak component of temporal variation in spectra at a frequency range having relatively large magnitude.

7. The method of claim 1, wherein the audio signal is a part segmented from a whole audio signal using a time window, and the determining, the calculating and the judging are repeatedly performed by sliding the time window to identify a period corresponding to the signal tone.

8. The method of claim 1, wherein the signal tone to be detected includes a ring tone and the audio signal is telephony data.

9. A computer system for detecting a signal tone in an audio signal, by executing program instructions, the computer system comprising:
    a memory storing the program instructions;
    processing circuitry in communications with the memory for executing the program instructions, wherein the processing circuitry is configured to:
    determine whether a peak modulation frequency in the audio signal is in a specific range or not to obtain a determination result;
    modify the determination result responsive to a false detection process utilizing spectrum and harmonic analysis of the audio signal, with the spectrum analysis including determining that a position of the peak frequency component within a specific time interval exceeds a predetermined threshold;
    calculate a measure regarding a modulation spectrum of the audio signal, wherein the measure is calculated based on at least components of the modulation spectrum above a specific limit of a modulation frequency; and
    judge whether the audio signal contains a signal tone or not using the determination result and the measure regarding the modulation spectrum.

10. The computer system of claim 9, wherein the processing circuitry is further configured to:
    analyze the audio signal to obtain a series of spectra along a time axis; and
    check whether the series of spectra shows a transition of a peak frequency component along the time axis or not to obtain a check result, wherein whether the audio signal contains the signal tone or not is judged further based on the check result.

11. The computer system of claim 10, wherein the processing circuitry is further configured to:
    confirm that there is no harmonic structure in the series of spectra to obtain a confirmation result, wherein whether the audio signal contains the signal tone or not is judged further based on the confirmation result.

12. The computer system of claim 9, wherein the measure is entropy of the modulation spectrum and whether the audio signal contains the signal tone or not is judged, at least in part, by comparing the entropy of the modulation spectrum with a predetermined threshold.

13. The computer system of claim 12, wherein the entropy of the modulation spectrum is calculated by treating a relative magnitude of a component in the modulation spectrum as an existence probability of the component.

14. The computer system of claim 9, wherein the peak modulation frequency represents a sustained peak component of temporal variation of spectra at a frequency range having relatively large magnitude.

15. The computer system of claim 9, wherein the audio signal is a part segmented from a whole audio signal using a time window, a determination as to whether the peak modulation frequency is in the specific range or not, a calculation of the measure and a judgement as to whether the audio signal contains the signal tone or not are repeatedly performed by sliding the time window to identify a period corresponding to the signal tone.

16. The computer system of claim 9, wherein the signal tone to be detected includes a ring tone and the audio signal is a telephony data.

17. A computer program product for detecting a signal tone in an audio signal, the computer program product comprising a computer readable storage medium having program instructions embodied therewith, the program instructions executable by a computer to cause the computer to perform a method comprising:

determining whether a peak modulation frequency in the audio signal is in a specific range or not to obtain a determination result;

modifying the determination result responsive to a false detection process utilizing spectrum and harmonic analysis of the audio signal, with the spectrum analysis including determining a transition of a peak frequency component in a spectra by checking linearity of the peak frequency component in the spectra;

calculating a measure regarding a modulation spectrum of the audio signal, the measure being calculated based on at least components of the modulation spectrum above a specific limit of a modulation frequency; and judging whether the audio signal contains a signal tone or not using the determination result and the measure regarding the modulation spectrum.

18. The computer program product of claim 17, wherein the method further includes:

analyzing the audio signal to obtain a series of spectra along a time axis; and checking whether the series of spectra shows a transition of a peak frequency component along the time axis or not to obtain a check result, the judging being done further based on the check result.

19. The computer program product of claim 18, wherein the method further includes:

confirming that there is no harmonic structure in the series of spectra to obtain a confirmation result, the judging being done further based on the confirmation result.

20. The computer program product of claim 17, wherein the measure is entropy of the modulation spectrum and the judging is done, at least in part, by comparing the entropy of the modulation spectrum with a predetermined threshold.

\* \* \* \* \*